US008825275B2

(12) United States Patent
Hoshino et al.

(10) Patent No.: US 8,825,275 B2
(45) Date of Patent: Sep. 2, 2014

(54) TROUBLE DIAGNOSIS DEVICE

(75) Inventors: Daisuke Hoshino, Tokyo (JP);
Michisuke Amano, Tokyo (JP);
Takayuki Abe, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 13/503,725

(22) PCT Filed: Nov. 4, 2010

(86) PCT No.: PCT/JP2010/006502
§ 371 (c)(1),
(2), (4) Date: Jul. 13, 2012

(87) PCT Pub. No.: WO2011/055542
PCT Pub. Date: May 12, 2011

(65) Prior Publication Data
US 2012/0271506 A1    Oct. 25, 2012

(30) Foreign Application Priority Data

Nov. 6, 2009   (JP) .................. 2009-254991

(51) Int. Cl.
*G06F 7/00*      (2006.01)
*G05B 23/02*     (2006.01)
(52) U.S. Cl.
CPC .................. *G05B 23/0275* (2013.01)
USPC ....................................... 701/31.4
(58) Field of Classification Search
USPC .................... 701/29.1, 29.7, 29.9, 31.4, 33.2; 702/182–184
See application file for complete search history.

(56) References Cited

U.S. PATENT DOCUMENTS

2005/0065679 A1 * 3/2005 Kawauchi et al. .............. 701/29

FOREIGN PATENT DOCUMENTS

| CN | 1581001 A | 2/2005 |
|---|---|---|
| CN | 1721834 A | 1/2006 |
| JP | 2589617 B2 | 12/1996 |
| JP | 2000-249736 A | 9/2000 |
| JP | 2000-276224 A | 10/2000 |
| JP | 2004-199500 A | 7/2004 |
| JP | 2005-063025 A | 3/2005 |
| JP | 2005-301836 A | 10/2005 |

OTHER PUBLICATIONS

International Search Report and Written Opinion corresponding to International Application No. PCT/JP2010/006502 dated Dec. 7, 2010.
Chinese Office Action dated Jun. 9, 2014, for corresponding CN Application No. 201080050180.4.

* cited by examiner

*Primary Examiner* — Yonel Beaulieu
(74) *Attorney, Agent, or Firm* — Squire Patton Boggs (US) LLP

(57) ABSTRACT

A diagnosis device with a display unit diagnoses troubles of a vehicle by communicating with an electronic control unit of the vehicle. The diagnosis device displays, on the display unit, parameters relating to operation of the vehicle for selection of the parameters to be measured, and displays on the display unit, trigger condition for measuring the selected parameters to be measured such that triggering conditions for the parameters to be measured may be set.

4 Claims, 5 Drawing Sheets

TROUBLE DIAGNOSIS DEVICE

FIELD OF THE INVENTION

The present invention relates to a device for diagnosing vehicle trouble, more specifically, it relates to a device for communicating with an electronic control unit of a vehicle to obtain measurement results of parameters relating to operation of the vehicle and for identifying cause of trouble of the vehicle.

BACKGROUND ART

Japanese patent No. 2,589,617 describes an apparatus for diagnosing vehicle trouble, which, responsive to diagnosis results (trouble code) from an electronic control unit on-board the vehicle having self-diagnostic capabilities, displays for selection work procedure for diagnosing trouble that can be reproduced while the vehicle is at rest and an alternative work procedure to be performed while the vehicle is at rest for diagnosing trouble that can only be reproduced while the vehicle is running.

Japanese patent application publication No. 2004-199500 discloses a checker apparatus for a shop machine, which displays for selection possible trouble items for each trouble of the shop machine and groups of sensors for each trouble item.

PROBLEM TO BE RESOLVED BY THE PRESENT INVENTION

Trouble of a vehicle includes trouble that is not recorded in terms of trouble code. The scheme described in Japanese patent 2,589,617 cannot cope with such trouble as it is based on trouble code from the electronic control unit.

In order to identify cause of trouble without a trouble code, a service person needs to select parameters for check-up from parameters relating to the operation of the vehicle and to set up triggering conditions (conditions for starting measurement) for the selected parameters.

Selection of the parameters and setting up of the triggering conditions require experience and skill of the service person, making it difficult for service persons having poor experience to adequately perform the selection and setting up. This is more so for setting up of the triggering conditions as it requires judge based on experience.

Accordingly, if the art described in Japanese patent application publication No. 2004-199500 is used to display possible cause of the trouble and groups of sensors relating to respective causes, a service person with poor experience would find it difficult to select adequate cause of the trouble and sensors. The above mentioned prior art references do not include selective display for setting up of triggering conditions for the parameters to be measured.

The present invention enables a service person to identify cause of trouble that is not recorded in terms of trouble codes rapidly and easily irrespective of the service person's experience and skill.

SUMMARY OF THE INVENTION

The present invention provides a diagnosis device with a display unit for diagnosing trouble of a vehicle by communicating with an electronic control unit of the vehicle. The diagnosis device comprises means for displaying, on the display unit, parameters relating to operation of the vehicle for selection of the parameters to be measured, means for displaying, on the display unit, the selected parameters to be measured such that triggering conditions for the parameters to be measured may be set, means for displaying, on the display unit, a group of signs of trouble with the vehicle such that a set of parameters to be measured corresponding to a sign selected from the group of signs may be set together with the triggering conditions for measuring the set of parameters to be measured, and means for displaying, on the display unit, result of measurement of the parameters to be measured.

According to the present invention, as the group of signs of trouble of a vehicle is displayed on a display unit such that a set of parameters to be measured corresponding to the sign of trouble selected from the group of signs and triggering conditions for triggering measurement of the set of parameters to be measured are displayed for setting, a service person may easily and adequately select the parameters to be measured corresponding to the sign of trouble and set the triggering conditions regardless of his or her experience and skill.

According an embodiment of the present invention, a different set of parameters to be measured is displayed by means of predetermined default values for respective signs of trouble and the triggering conditions are displayed for respective sets of parameters to be measured.

According to another embodiment of the present invention, as the set of parameters to be measured and the triggering conditions for them are displayed in terms of default values, setting may be made viewing these values.

According to an embodiment of the present invention, the group of operational parameters and the group of signs of trouble are displayed on one screen of the display unit, the parameters of the set of parameters to be measured that correspond to the sign of trouble selected from the group of signs are displayed in the display of the group of operational parameters and can be modified.

According to an embodiment of the present invention, as respective parameters of the set of parameters to be measured corresponding to the sign of trouble selected from the display of the group of signs of trouble are displayed in the display of the group of parameters and can be modified, the parameters to be measured set in the display of the group of sign of trouble may modified (delete, add) in the display of the group of operational parameters. As a result, adequate parameters may be selected for measurement with the experience and skill of the service person.

According to an embodiment of the present invention, respective measurement results for at least two parameters are displayed on one screen in terms of graphic chart.

According to an embodiment of the present invention, as respective measurement results for two or more parameters are displayed on one screen in terms of graphic chart, comparison and evaluation of the measurement result may be facilitated enabling quick identification (diagnosis) of the cause of the trouble.

DETAILED DESCRIPTION

Figure 1:
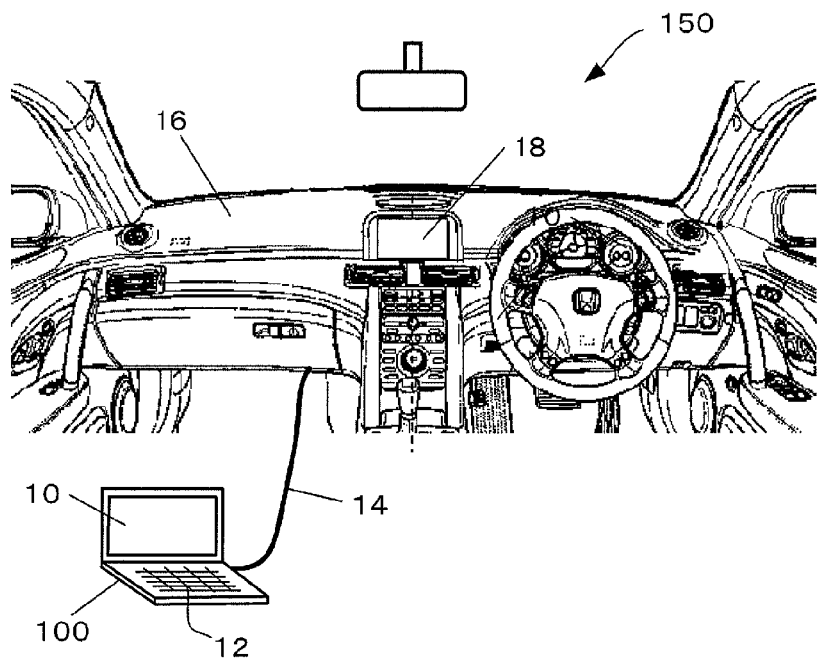
FIG. 1 illustrates a diagnosis device according to an embodiment of the present invention connected to a vehicle.

Now, an embodiment of the present invention will be described referring to the drawings. FIG. 1 illustrates a trouble diagnosis device connected to a vehicle according to an embodiment of the present invention. A trouble diagnosis device 100 comprises a display unit 10 and input unit 12, and is connected, via a communications cable 14, to a connector (not shown) beneath a front panel 16 of a vehicle 150. The connector connects to an electronic control unit (ECU) on-board the vehicle. The ECU is a computer having a central processing unit (CPU) and a memory, and controls the engine and other components of the vehicle based on signals received from a number of sensors provided to the engine and the other components of the vehicle.

FIG. 1 illustrates trouble diagnosis device 100 in the form of a notebook type personal computer. However, trouble diagnosis device 100 may be any type of handy device, which may use a display unit and an entry unit of a navigation system 18 as its display unit and input unit. Trouble diagnosis device 100 may communicate with the ECU on-board the vehicle or an external computer (PC, server, etc.) via wireless communications without using communications cable 14.

Figure 2:
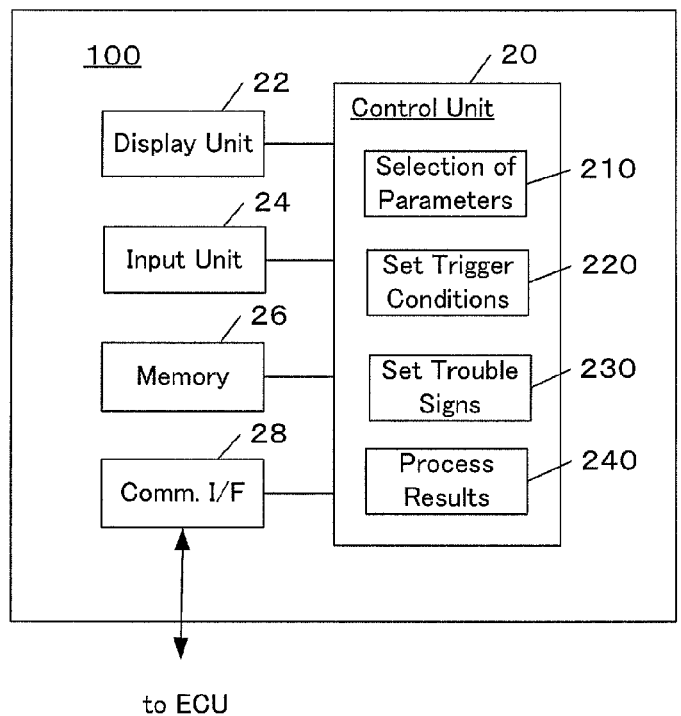
FIG. 2 is a block diagram of a diagnosing apparatus according to an embodiment of the present invention.

FIG. 2 is a block diagram showing an example of the configuration of trouble diagnosis device 100, which comprises control unit 20, display unit 22, input unit 24, memory 26, and communications interface 28. Control unit 20 is a computer having a CPU and a memory, and controls display unit 22, memory 26, and communications interface 28 to perform the functions shown in blocks 210-240 in FIG. 2, details of which will be described hereafter.

Display unit 22 includes a display such as a liquid crystal display (LCD) and a speaker if necessary. Input unit 24 includes an input component such a keyboard and a mouse. Input unit may take the form of a touch panel incorporated into display unit 22. Also, input unit may include a voice input system known in the art and available in the market.

Memory 26 may include a volatile memory such as a random access memory (RAM), a non-volatile memory such as a read only memory (ROM), and a rewritable non-volatile memory such as a flash memory and a hard disk drive (HDD). The volatile memory temporarily stores data such as data entered with input unit 24 and measurement data obtained via communications interface 28 from the ECU of the vehicle. The non-volatile memory stores computer programs (software) for control unit 20 to perform various functions, and non-volatile rewritable memory stores data to be reserved for later utilization such the results of processing measurement data.

Communications interface 28 may be a wired communications interface or a wireless communications interface. In case of wired communications interface, diagnosis device 100 communicates with the ECU of the vehicle via cable 14 shown in FIG. 1. In case of wireless communications interface, diagnosis device communicates with the ECU of the vehicle via an antenna (not shown).

Figure 3:
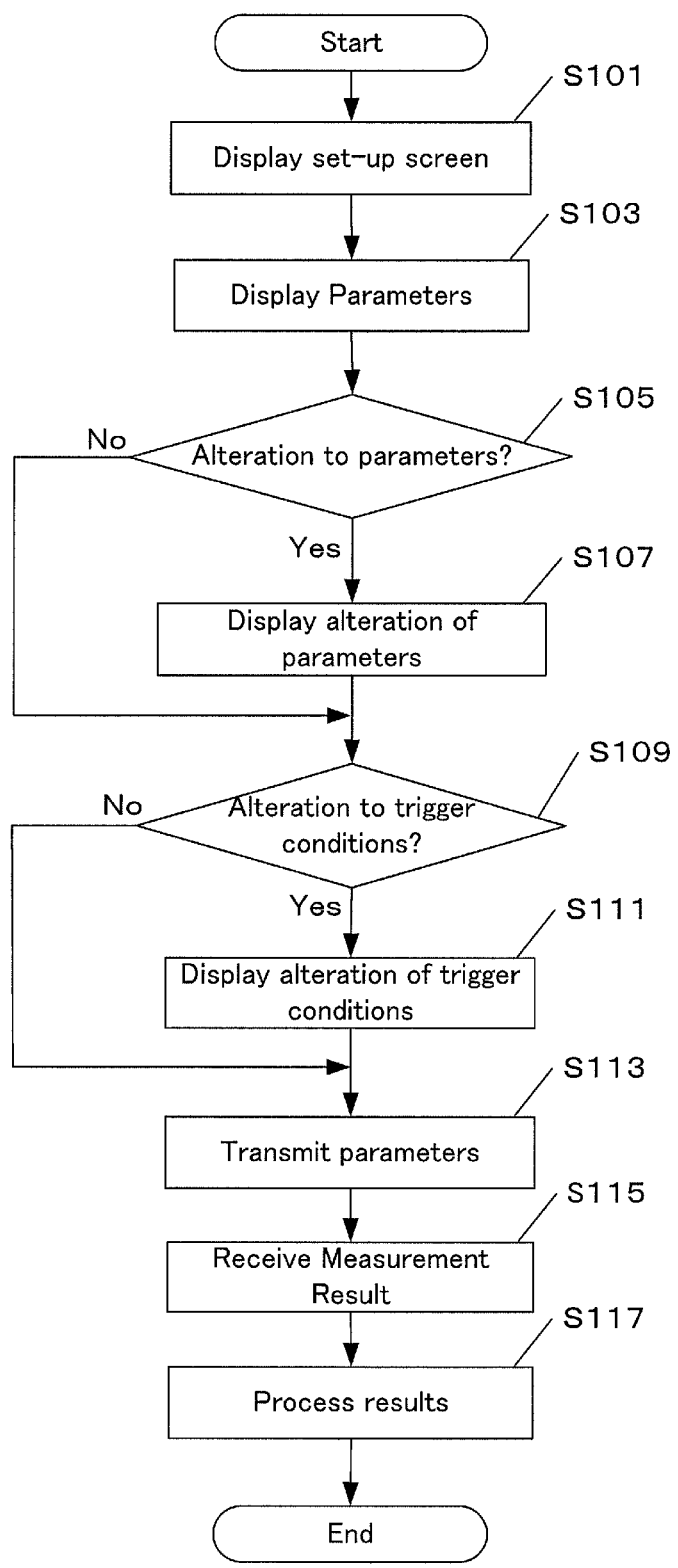
FIG. 3 illustrates a flow chart of the process performed by a diagnosis device according to an embodiment of the present invention.

Now, operation of trouble diagnosis device 100 will be described referring to the drawings. FIG. 3 is a flow chart showing operational flow of trouble diagnosis device. This operational flow is achieved with the CPU retrieving and executing diagnosis program stored in memory 26. In this embodiment, display unit 22 is a display of the personal computer illustrated in FIG. 1. Thus, display content may be modified with the mouse moving a cursor, with icons clicked, or entry of numerical values by keyboard.

In step S101 of FIG. 3, a set-up screen is displayed for selection of respective parameters to be measured in relation to respective signs of trouble and for setting of triggering conditions for measuring a selected set of parameters. In the following discussion, operational parameters shall mean parameters relating to operation (driving) of the vehicle, out of which those operational parameters that are actually measured shall be called parameters to be measured.

Figure 4:
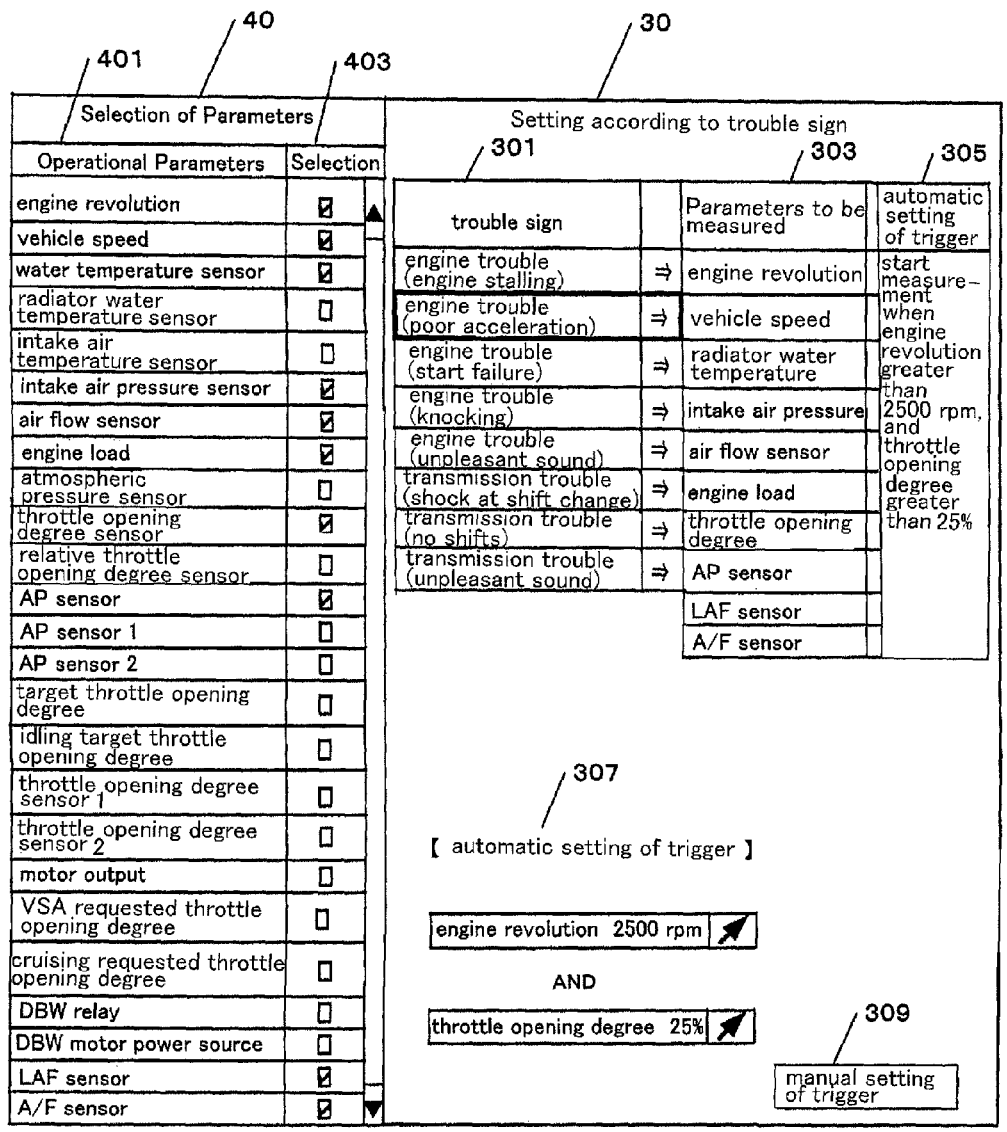
FIG. 4 illustrates an example of the screen for setting conditions for diagnosis according to signs of trouble.

FIG. 4 shows an example of the set-up screen. An area or window 30 provides area for setting according to respective signs of trouble. In the example of FIG. 4, eight signs of trouble are shown in the fields of trouble signs 301. The number of signs and the content of the signs are set in advance. In the example of FIG. 4, a service person selects the second sign from the top in trouble sign field 301, that is, "engine trouble (poor acceleration)". In response to the selection, a set of parameters to be measured is determined and is displayed in the parameter field 303. In this example, the set of parameters to be measured comprises ten parameters, from "engine revolution" at the top to "A/F (air/fuel) ratio sensor" at the bottom. Respective outputs from the sensors listed in the field 303 are measured as respective parameters.

When another sign is selected from trouble signs 301, a set of parameters to be measured corresponding to the selected sign is automatically displayed in field 303. The number and content of parameters to be measured for respective trouble signs may be set in accordance with the situations where the trouble sign of the vehicle appeared. Conditions for triggering measurement of the set of parameters identified in parameter field 303 are determined and displayed in triggering condition field 305, for example, AND condition of "engine revolution larger than 2500 rpm" and "open degree of throttle sensor larger than 25%". The triggering conditions may be displayed in the form of logical formula shown at 307 at a lower part in window 30.

As discussed above, when one of the trouble signs 301 is selected, corresponding set of parameters to be measured 303 and triggering conditions 305, 307 for measurement are automatically displayed. Accordingly, the service person may set the parameters to be measured and determine the triggering conditions for identifying the cause of the trouble sign, irrespective of his or her experience and skill. Incidentally, the triggering conditions in this specification refer to the conditions for starting measurement of the parameters.

In step S103, a screen or window 40 (FIG. 4) for selection of parameters to be measured is displayed. In window 40, a plurality of sensors are displayed as operational parameters 401 relating to operation (driving) of the vehicle. Each operational parameter is provided with a selection field 403. Entry of check marks either automatically or manually in the selection field 403 select the corresponding parameters for measurement. In the example of FIG. 4, ten parameters corresponding to the trouble sign of "engine trouble (poor acceleration)" as selected from window 30 are automatically (by parameter selection unit 210) given check marks.

In step S105, alteration of the parameters to be measured is determined. If there is a request for alteration, a screen for altering parameters to be measured is displayed. In the example of FIG. 4, window 40 may be used for manually altering the parameters to be measured. A separate window may be used for this purpose. The service person may remove some of the check marks from some of the selection fields 403 or enter check marks to other operational parameters in order to select the parameters to be measured in accordance with his or her experience. If there is no alteration, the process may skip step S107 to proceed to step S109.

In step S109, determination is made whether alteration of the triggering conditions is needed. If alteration is needed, a screen for altering the triggering conditions is displayed in step S111. In the example of FIG. 4, clicking of an icon 309 for manual setting initiates display of the screen for altering the triggering conditions.

Figure 5:
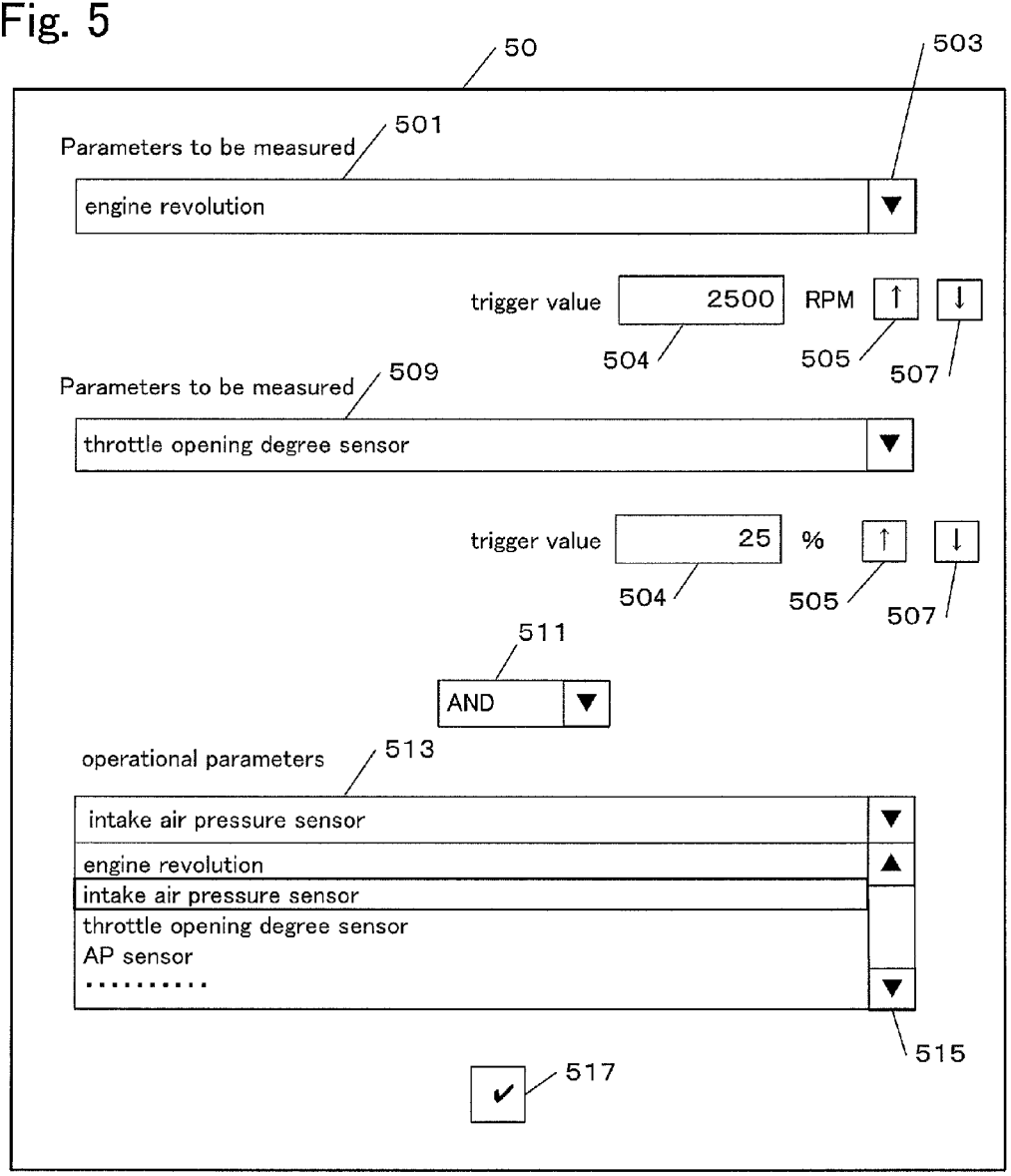
FIG. 5 illustrates an example of the screen for modifying triggering conditions.

FIG. 5 illustrates an example of a screen or window 50 for altering triggering conditions. Two triggering conditions "engine revolution" and "Throttle Opening Degree Sensor" have already been automatically selected as default selection in the window 30 of FIG. 4. Such default selection is shown in the example of FIG. 5. A service person may push button 505 to increase triggering value of 2500 RPM shown in field 504 or push button 507 to decrease the same. The service person may also push a scroll button 503 to delete "Engine Revolution" from a parameter field 501. Similar operation may be made relative to "Throttle Opening Degree Sensor" in a parameter field 509.

When addition of a triggering condition is desired, first "AND" or "OR" is selectively set at a field 511 to indicate the logic of addition. Then, a parameter to be added for the triggering condition may be selected from the operational parameters listed in filed 513. Field 513 may be scrolled for selection of a operational parameter with the use of scroll button 515. In the example shown in FIG. 5, the intake air pressure sensor is selected in filed 513.

When a decision button 517 is pushed to enter a check mark, fields that are similar to the fields 504, 505 and 507 additionally appear on the screen to enable setting of a trigger value for the intake air pressure sensor in a similar manner as for engine revolution 501 and throttle opening degree sensor 509. The service person may set the trigger value for the intake air pressure sensor as he or she desires.

When setting of the parameters to be measured and the triggering conditions is finished, the content (data) is displayed on the display unit 22 in the form of confirmation screen and is stored in memory 22 in a predetermined format that is retrievable by the ECU. In step S113, either responsive to a direction by the service person or automatically, the data is transmitted to the ECU on-board the vehicle via the communications interface 28.

The ECU on-board the vehicle sets the parameters to be measures and the conditions for starting measurement based on the received data to prepare for the measurement. Then, the engine of the vehicle is started to put the vehicle in an operational state (drivable state, driving state). The operational state may be achieved in a service site or in a real driving on a road in accordance with the parameters to be measured that are selected according to the trouble sign. When the operational state of the vehicle reached to satisfy the conditions for starting measurement, the ECU on-board the vehicle receives detection signals from the sensors associated with the set of parameters to be measured, stores the measured data in the embedded memory in a predetermined format, and send the measured data to the trouble diagnosis device 100.

In step S115, the trouble diagnosis device 100 receives measurement data from the ECU on-boar the vehicle. The receive data is stored in memory 26. In step S117, control unit 20 processes the data. The result of processing by control unit 20 is stored in memory 26 and is displayed on the display unit 22.

Figure 6:
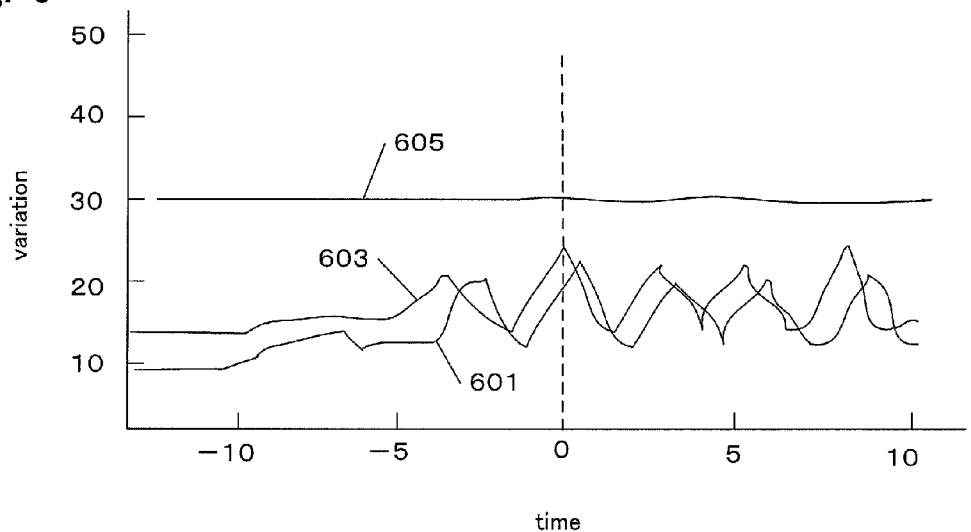
FIG. 6 illustrates an example of measurement result.
Figure 7:
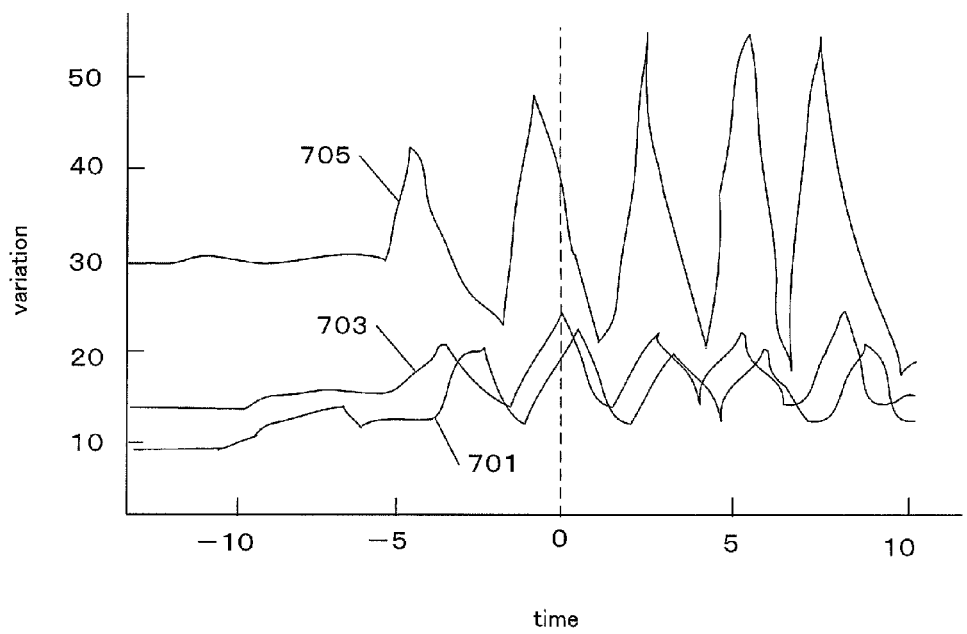
FIG. 7 illustrates another example of measurement result.

FIGS. 6 and 7 show examples of measurement results that are displayed on the display unit 22. FIG. 6 shows measurement result for a vehicle causing a trouble sign, while FIG. 7 shows measurement result for a normal vehicle that does not show a trouble sign. The measurement result shown in FIG. 7 has been obtained separately by performing measurement under similar conditions with a vehicle of the same model and has been stored in memory 22 in advance.

The service person may study the measurement result taking into consideration of the mutual relations among the respective operational parameters to determine or identify the cause of the trouble or the component that caused the trouble. In doing so, the service person may compare the measurement result such as shown in FIG. 6 with the measurement result under similar conditions for a similar vehicle as shown in FIG. 7 to determine the cause of the trouble. For this purpose, the two charts may be displayed on the same screen of the display unit 22 respectively in two windows, one chart in one window adjacent to each other. Alternatively, the tow measurement result may be composed into one chart for display.

Now, description will be made for the process of determining the cause of trouble by comparing the two charts.

In FIGS. 6 and 7, out of ten parameters to be measured selected in FIG. 4, respective measurement results are shown in the form of respective graphs for engine revolution 601 and 701, throttle opening degree sensor output 603 and 703, and intake air pressure sensor output 605 and 705. Time "0" in the horizontal axis indicates the time when the triggering conditions are satisfied to start measurement, with a minus and a plus respectively indicating time before "0" and time after "0". The vertical axis indicates variant amount 605 and 705 of intake air pressure sensor outputs. As mentioned above, the number of parameters to be measured and their contents may be arbitrarily selected responsive to the trouble sign.

In FIG. 6, intake air pressure output 605 does not significantly change with respect to variation of throttle opening degree sensor output 603, while in FIG. 7, intake air pressure sensor output 705 significantly changes in association of variation of throttle opening degree sensor output 703. The service person may notice that intake air pressure sensor output 605 in FIG. 6 is abnormal. Thus, the cause of the trouble of the vehicle may quickly be determined to lie with the intake air pressure sensor.

It is possible that abnormality of intake air pressure sensor output 605 is caused by dust and fouling adhering to a sensing part of the intake air pressure sensor, thereby hindering transfer of pressure. Intake air pressure sensor output 605 keeps almost a constant value, which is within an expected region of values for real driving. Therefore, the ECU of the vehicle will not issue a trouble code. As such, the trouble shown in FIG. 6 is a trouble that may not be recorded with a trouble code. Conventionally, cause of such a trouble was hard to identify. According to the present invention, as described above, the cause of the trouble can readily be identified to lie in the intake air pressure sensor.

The embodiment discussed above is shown for exemplary purpose and does not limit the scope of the present invention. The present invention may be used for diagnosis of trouble of a vehicle of every kind that is provided with the ECU.

What is claimed is:

1. A trouble diagnosis device having a display unit and communicating with an electronic control unit of a vehicle to diagnose trouble of the vehicle, said trouble diagnosis device having a processor and a memory and is configured to:

display on the display unit operational parameters relating to operation of the vehicle such that one or more parameters to be measured may be selected from the operational parameters;

display on the display unit trigger condition for measuring the selected one or more parameters to be measured, such that the trigger condition may be set for each one of the parameters to be measured;

display on the display unit a set of parameters to be measured that correspond to a trouble sign selected from a group of trouble signs, the set of parameters to be measured being presented along with the trigger condition for the set of parameters to be measured; and process measurement result of the parameters to be measured to comparably display on the display unit the measurement result.

2. The trouble diagnosis device of claim 1, being further configured to display said set of parameters to be measured in terms of respective default values that are predetermined for respective trouble signs, and displaying said trigger condition in terms of respective default values that are predetermined for respective sets of parameters to be measured.

3. The trouble diagnosis device of claim 1, wherein said group of operational parameters and said group of trouble signs are displayed on a single screen, and wherein the set of parameters to be measured that is associated with the trouble sign selected from the display of the group of trouble signs is included and selectable in the display of the group of operational parameters.

4. The trouble diagnosis device of claim 1, being further configured to display at least two measurement results of the parameters to be measured as respective graphs in a single screen.

* * * * *